United States Patent Office 3,745,087
Patented July 10, 1973

3,745,087
PROCESS FOR PREPARING 5′-NUCLEOTIDES
Shigeo Abe, Tokyo, and Akira Furuya, Machida-shi, Japan, assignors to Kyowa Hakko Kogyo Co., Ltd., Tokyo, Japan
No Drawing. Filed Mar. 31, 1967, Ser. No. 627,311
Claims priority, application Japan, Apr. 15, 1966, 41/23,564
Int. Cl. C12d 13/06
U.S. Cl. 195—28 N    12 Claims

ABSTRACT OF THE DISCLOSURE

This disclosure relates to a process for producing 5′-nucleotides by fermentation using 5′-nucleotide-producing mutant strains belonging to the genus Brevibacterium or the genus Corynebacterium. The mutant strains are modified so as not to be subject to any inhibition to producing 5′-nucleotides in the presence of excess manganese. These mutant strains are obtained by ultraviolet, γ-ray or X-ray irradiation or by chemical treatment of parent strains capable of producing 5′-nucleotides. Culturing is carried out in an aqueous nutrient medium under aerobic conditions, preferably at a temperature of about 20°–40° C. and a pH of about 5–9.

---

The present invention relates to a process for preparing 5′-nucleotides by fermentation. In particular, the present invention relates to a process for preparing 5′-nucleotides by fermentation using 5′-nucleotide-producing mutant strains belonging to the genera Brevibacterium and Corynebacterium. These particular mutant strains are so modified as not to be subject to inhibition in the presence of excess manganese.

Up to the present time, the phenomenon that heavy metal ions such as manganese inhibit the accumulation of 5′-nucleotides has been observed when 5′-nucleotides are produced by a fermentation method. The present inventors have succeeded in deriving artificial mutant strains which make it possible to achieve the accumulation of 5′-nucleotides in high yields without any obstacle, even in the presence of large amounts of such heavy metal ions. Accordingly, when fermentation is carried out to produce 5′-nucleotides in accordance with the present invention, pretreatment steps, such as the elimination of heavy metal ions, is unnecessary, even though crude materials which contain large amounts of heavy metals such as manganese be used. Moreover, during the fermentation per se, it is not necessary to prevent contamination by heavy metals such as manganese, which may derive from the crude materials being used, the water, the iron fermentation tank, etc. This is clearly a decided advantage to an industrial method of production.

Accordingly, one of the objects of the present invention is to provide an improved process for the production of 5′-nucleotides which overcomes the disadvantages and deficiencies of the prior art methods.

Another object of the present invention is to provide a process for producing 5′-nucleotides by fermentation which may be carried out in an efficacious and simple manner.

A further object of the invention is to provide a process for producing 5′-nucleotides by fermentation which may be carried out advantageously on an industrial scale at low cost to give a high yield of product.

A still further object of the invention is to provide 5′-nucleotides such as 5′-inosinic acid, 5′-guanylic acid, 5′-adenylic acid and 5′-uridylic acid.

These and other objects and advantages of the present invention will become apparent to those skilled in the art from a consideration of the following specification and claims.

In accordance with the present invention, it has been found that remarkably large quantities of 5′-nucleotides such as, for example, 5′-inosinic acid, 5′-guanylic acid, 5′-adenylic acid and 5′-uridylic acid, may be obtained if fermentation is carried out with the use of particular 5′-nucleotide-producing mutant strains belonging to the genera Brevibacterium and Corynebacterium in an aqueous nutrient medium under aerobic conditions. In this way, remarkable amounts of the 5′-nucleotides are accumulated in the fermentation liquor and in the bacterial cells.

The mutant strains employed in the present invention are obtained by subjecting 5′-nucleotide-producing strains belonging to the genus Brevibacterium or the genus Corynebacterium to ultraviolet, γ-ray or X-ray irradiation or chemical treatment with alkylating agents and the like. Comparisons are then made to determine the capacity of various microorganism strains which are capable of accumulating large amounts of 5′-nucleotides even in the presence of excess manganese, i.e., 1,000–10,000 μg./l. as manganese ion.

Specifically, *Brevibacterium ammoniagenes* Mn–11 ATCC 21061 is obtained by subjecting the parent strain *Brevibacterium ammoniagenes* 20104, a 5′-inosinic acid-producing strain, to ultraviolet irradiation. *Brevibacterium ammoniagenes* Mn–21 ATCC 21062 is obtained by using, as the parent strain, *Brevibacterium ammoniagenes* 7208 ATCC 15187, this strain being a 5′-inosinic acid-producing strain and indispensably requiring adenine for its growth, and subjecting the same to γ-ray irradiation. *Corynebacterium glutamicum* Mn–31 ATCC 21065 and Mn–32, were obtained, respectively, by ultraviolet irradiation and by treatment with diethyl sulfate using, as the parent strain, *Corynebacterium glutamicum* 5431, the latter parent strain being a 5′-inosinic acid-producing strain which indispensably requires adenine for its growth. *Brevibacterium ammoniagenes* Mn–41 ATCC 21063, and Mn–42 ATCC 21064, were obtained, respectively, by the ultraviolet and γ-ray irradiation of the parent strain *Brevibacterium ammoniagenes* ATCC 6872, this parent strain being capable of producing 5′-guanylic acid, 5′-adenylic acid and 5′-uridylic acid.

The fermentation employed in the present invention for obtaining 5′-nucleotides is conducted under aerobic conditions, such as aerobic shaking of the culture or with stirring with aeration of a submerged culture, at a temperature of about 20° to 40° C. and at a pH of about 5 to 9. If a pH adjustment is required during culturing, it is suitable to use neutralizing agents such as aqueous ammonia and sodium hydroxide as well as the urea which is converted to ammonia by the urease possessed by the bacteria employed. After about two to six days of culturing under these conditions, remarkably large amounts of 5′-nucleotides are found to be accumulated in the culture medium as well as in the bacterial cells.

Either a synthetic culture medium or a natural nutrient medium is suitable in the present invention as long as it contains the essential nutrients for the growth of the strain employed. Such nutrients are well known in the art and include substances such as a carbon source, a nitrogen source, inorganic compounds and the like which are utilized by the microorganism employed in appropriate amounts. Thus, as a carbon source, there may be mentioned, by way of example, carbohydrates such as glucose, fructose, maltose, sucrose, starch, starch hydrolysate, molasses, etc., or any other suitable carbon source such as glycerol, mannitol, sorbitol, organic acids, etc. These substances may be used either singly or in mixtures of two or more. As a nitrogen source, various kinds of inorganic or organic salts or compounds, such as urea or ammonium salts such as ammonium chloride, ammonium sulfate, ammonium nitrate, ammonium phosphate, etc., or one or more than one amino acid mixed in combination, or natural substances containing nitrogen, such as cornsteep liquor, yeast extract, meat extract, peptone, fish meal, casein hydrolysates, casamino acid, fish solubles, rice bran extract, etc., may be employed. The source of nitrogen may also be a single substance or a combination of two or more. Inorganic compounds which may be added to the culture medium include magnesium sulfate, sodium phosphate, potassium dihydrogen phosphate, potassium monohydrogen phosphate, iron sulfate or other iron salts, manganese chloride, calcium chloride, etc. As is known in the art, growth-promoting agents such as biotin or amino acids such as glutamic acid or aspartic acid may also be added to the medium as desired.

After the completion of fermentation, the 5'-nucleotides can be recovered by removing the bacterial cells from the fermentation liquor and then treating the resultant fermentation filtrate by conventional means, such as ion exchange resin treatment, extraction with solvents, precipitation with metallic salts, chromatography, adsorption and the like.

The following examples are given merely as illustrative of the present invention and are not to be considered as limiting. Unless otherwise noted, the percentages therein are by weight.

EXAMPLE 1

*Brevibacterium ammoniagenes* Mn–11 ATCC 21061, a 5'-inosinic acid-producing strain, is employed as the seed bacterium. It is cultured at 30° C. for 24 hours in a conical flask having a capacity of two liters and containing 300 ml. of a culture medium comprising 2% of glucose, 1% of peptone, 1% of bouillon, 0.3% of NaCl and 20 μg./l. of biotin.

The seed strain is then transplanted into a 5 liter jar fermentor containing 3 liters of a fermentation culture medium having the following composition:

| | |
|---|---|
| Glucose | percent 10 |
| $KH_2PO_4$ | do 1.0 |
| $K_2HPO_4$ | do 1.0 |
| $MgSO_4 \cdot 7H_2O$ | do 1.0 |
| $CaCl_2 \cdot 2H_2O$ | do 0.01 |
| $ZnSO_4 \cdot 7H_2O$ | mg./l 1 |
| $FeSO_4 \cdot 7H_2O$ | mg./l 20 |
| L-cystine | mg./l 20 |
| Biotin | mg./l 30 |
| Calcium pantothenate | mg./l 10 |
| Vitamin $B_1$ | mg./l 5 |
| Urea | percent 0.6 |
| Bouillon | do 1.0 |
| $MnCl_2 \cdot 4H_2O$ | mg./l 20 |

The pH of the fermentation medium after sterilization is 7.6.

Culturing is then carried out at 33° C. at 600 r.p.m. with an aeration of 3 liters per minute. The pH of the medium is adjusted to within 7.0–9.0 with aqueous ammonia during the fermentation.

After 96 hours of culturing, 16.7 mg./ml. of 5'-inosinic acid is found to be accumulated in the culture liquor. As a comparison, *Brevibacterium ammoniagenes* 20104, the original parent strain of *Brevibacterium ammoniagenes* Mn–11 ATCC 21061, and a 5'-inosinic acid-producing strain, is cultured under the same conditions; however, the amount of 5'-inosinic acid accumulated is only 1 mg./ml. or less because of the presence of excess manganese in the culture medium.

One liter of a clear solution obtained by removing the bacterial cells from the fermentation liquor of *Brevibacterium ammoniagenes* Mn–11 ATCC 21061 is adjusted to a pH of 1.4 with hydrochloric acid and is passed through an ion exchange resin column filled with Diaion SK #1 (H type). Water is then immediately run through the column, and the fractions of washings containing 5'-inosinic acid eluted during the initial period of water washing are combined and adjusted to a pH of 7.2 with sodium hydroxide. Concentration thereof under reduced pressure gives crystals of the sodium salt of 5'-inosinic acid. The yield of product is 13.4 g.

EXAMPLE 2

*Brevibacterium ammoniagenes* Mn–21 ATCC 21062, a 5'-inosinic acid-producing strain, is used as the seed bacterium. Culturing is carried out as described in Example 1 in a fermentation culture medium having the following composition:

| | |
|---|---|
| Waste molasses hydrolysate (about 10% when converted to glucose) | percent 20 |
| $KH_2PO_4$ | do 1.0 |
| $K_2HPO_4$ | do 1.0 |
| $MgSO_4 \cdot 7H_2O$ | do 1.0 |
| Vitamin $B_1$ | mg./l 5 |
| Calcium pantothenate | mg./l 10 |
| L-cystine | mg./l 20 |
| Adenine | mg./l 5 |
| Urea | percent 0.6 |

The pH of the fermentation medium is 7.6 after sterilization. The pH of this culture medium is maintained at around 7.0 by the addition of a urea solution thereto.

After 96 hours of culturing, 20.5 mg./ml. of 5'-inosinic acid and 1.5 mg./ml. of hypoxanthine are accumulated in the culture liquor.

*Brevibacterium ammoniagenes* 7208 ATCC 15187, an original parent strain of *Brevibacterium ammoniagenes* Mn–21 ATCC 21062 and a 5'-inosinic acid-producing strain, is cultured under the same conditions. However, the amount of 5'-inosinic acid accumulated in the culture liquor is only 0.6 mg./ml. because of the excess manganese contained in the waste molasses.

EXAMPLE 3

*Corynebacterium glutamicum* Mn–31 ATCC 21065, which is a strain capable of producing 5'-inosinic acid, is employed as the seed strain. Culturing is carried out therewith in the same manner and under the same conditions as described in Example 1. As the fermentation culture medium, the following composition is used:

| | |
|---|---|
| Starch hydrolysate (about 10% when converted to glucose) | percent 50 |
| $KH_2PO_4$ | do 1.0 |
| $K_2HPO_4$ | do 1.0 |
| $MgSO_4 \cdot 7H_2O$ | do 0.3 |
| $MnCl_2 \cdot 4H_2O$ | mg./l 10 |
| $(NH_4)_2SO_4$ | percent 1.5 |
| Corn steep liquor | do 0.5 |
| Adenine | mg./l 5 |

The pH of the culture medium is 7.3 before sterilization thereof. The pH of this medium is maintained at around 6.5 by the addition of aqueous ammonia thereto during culturing.

After 84 hours of culturing, 14.3 mg./ml. of 5'-inosinic acid is accumulated in the fermentation liquor. As a comparison, *Corynebacterium glutamicum* 5431, an original strain of *Corynebacterium glutamicum* Mn–31 ATCC 21065 and a 5'-inosinic acid-producing strain, is cultured under the same conditions. However, only 0.28 mg./ml. of 5'-inosinic acid is accumulated therewith.

EXAMPLE 4

*Brevibacterium ammoniagenes* Mn–41 ATCC 21063, a 5'-nucleotide-producing strain, is cultured under the same conditions and with the same procedure as described in Example 1, except that 9 g. of guanine is added to 3 liters of the culture medium after 30 hours from the beginning of culturing. After 72 hours of culturing, 8 mg./ml. of 5'- guanylic acid is accumulated in the resultant culture liquor.

Brevibacterium ammoniagenes ATCC 6872, the original parent strain of Brevibacterium ammoniagenes Mn-41 ATCC 21063 and a 5'-nucleotide-producing strain, is cultured under the same conditions, but no accumulation of 5'-guanylic acid is observed therewith.

EXAMPLE 5

Brevibacterium ammoniagenes Mn-42 ATCC 21064, a 5'-nucleotide-producing strain, is used as the seed bacterium and is cultured under the same conditions and with the same procedure as that described in Example 3, except that 9 g. of uracil is added to 3 liters of the culture medium after 30 hours from the initiation of the culturing. After 72 hours of culturing, 7.2 mg./ml. of 5'-uridylic acid is accumulated in the fermentation liquor.

Brevibacterium ammoniagenes ATCC 6872, the original parent strain of Brevibacterium ammoniagenes Mn-42 ATCC 21064 and a strain capable of producing 5'-nucleotides, is also cultured under the same conditions, but no accumulation of 5'-uridylic acid is obtained therewith.

The invention being thus described, it will be obvious that the same may be varied in many ways. Such variations are not to be regarded as a departure from the spirit and scope of the invention, and all such modifications are intended to be included within the scope of the following claims.

What we claim is:

1. A process for producing 5'-nucleotides which comprises culturing a mutant strain capable of producing 5'-nucleotides in the presence of excess manganese in an amount of from 1,000 to 10,000 micrograms per liter as manganese ion and belonging to *Brevibacterium ammoniagenes* or *Corynebacterium glutamicum* ATCC 21065 in an aqueous nutrient medium under aerobic conditions, and recovering the 5'-nucleotides from the resultant culture liquor and bacterial cells.

2. The process of claim 1, wherein said culturing is carried out at a temperature of between about 20° and 40° C. and at a pH of from approximately 5 to 9.

3. The process of claim 1, wherein the 5'-nucleotides are selected from the group consisting of 5'-inosinic acid, 5'-guanylic acid, 5'-adenylic acid and 5'-uridylic acid.

4. The process of claim 1, wherein said mutant strain is *Brevibacterium ammoniagenes* Mn-11 ATCC 21061.

5. The process of claim 1, wherein said mutant strain is *Brevibacterium ammoniagenes* Mn-21 ATCC 21062.

6. The process of claim 1, wherein said mutant strain is *Corynebacterium glutamicum* Mn-31 ATCC 21065.

7. The process of claim 1, wherein said mutant strain is *Brevibacterium ammoniagenes* Mn-41 ATCC 21063.

8. The process of claim 1, wherein said mutant strain is *Brevibacterium ammoniagenes* Mn-42 ATCC 21064.

9. A process for producing 5'-nucleotides which comprises culturing a mutant strain selected from the group consisting of *Brevibacterium ammoniagenes* Mn-11 ATCC 21061, *Brevibacterium ammoniagenes* Mn-21 ATCC 21062, *Corynebacterium glutamicum* Mn-31 ATCC 21065, *Brevibacterium ammoniagenes* Mn-41 ATCC 21063 and *Brevibacterium ammoniagenes* Mn-42 ATCC 21064 in an aqueous nutrient medium containing excess manganese in an amount of from 1,000 to 10,000 micrograms per liter as magnesium ion under aerobic conditions, accumulating the 5'-nucleotides in the resultant culture liquor, and recovering said 5'-nucleotides from the culture liquor and the bacterial cells.

10. The process of claim 9, wherein said culturing is carried out at a temperature of between 20° and 40° C. and at a pH of from approximately 5 to 9.

11. The process of claim 10, wherein the 5'-nucleotides are selected from the group consisting of 5'-inosinic acid, 5'-guanylic acid, 5'-adenylic acid and 5'-uridylic acid.

12. The process of claim 10, wherein said 5'-nucleotides are recovered from the resultant fermentation liquor by an ion exchange resin treatment.

References Cited

UNITED STATES PATENTS

| | | | |
|---|---|---|---|
| 3,152,966 | 10/1964 | Kinoshita et al. | 195—28 N |
| 3,214,344 | 10/1965 | Kinoshita et al. | 195—28 N |
| 3,249,511 | 5/1966 | Okumura et al. | 195—28 N |
| 3,366,627 | 1/1968 | Jacob et al. | 195—28 N |
| 3,410,753 | 11/1968 | Demain et al. | 195—28 N |

FOREIGN PATENTS 983,213  2/1965  Great Britain.

ALVIN E. TANENHOLTZ, Primary Examiner